United States Patent [19]

Tsay et al.

[11] 4,075,063
[45] Feb. 21, 1978

[54] SOLAR POWERED DISTILLING DEVICE

[76] Inventors: Yaw Jenn Tsay; Kuo-Chuan Lin, both of No. 10, Lane 177, Pei Hsing St., Chia I, China /Taiwan

[21] Appl. No.: 658,692

[22] Filed: Feb. 17, 1976

[51] Int. Cl.² .............................................. B01D 3/00
[52] U.S. Cl. ..................................... 202/234; 203/10; 203/DIG. 1
[58] Field of Search .................. 202/234, 83, 189–193; 203/10, DIG. 1; 126/271; 350/211

[56] References Cited

U.S. PATENT DOCUMENTS

| | | | |
|---|---|---|---|
| 1,277,065 | 8/1918 | Gundlach | 350/127 |
| 1,588,192 | 6/1926 | Schermerhorn | 202/191 X |
| 2,277,311 | 3/1942 | Freeman | 126/271 |
| 2,975,107 | 3/1961 | Friedman | 203/DIG. 1 X |
| 3,125,091 | 3/1964 | Sleeper | 350/211 X |
| 3,870,605 | 3/1975 | Sakamoto | 202/190 X |

Primary Examiner—Norman Yudkoff
Assistant Examiner—Martin G. Mullen
Attorney, Agent, or Firm—Shoemaker and Mattare

[57] ABSTRACT

A solar powered distilling device, and more particularly, a device wherein a plurality of convex lenses concentrate the heat energy of sunlight to heat and vaporize a quantity of water, said water vapor rising from a vaporization chamber to a cooling chamber by virtue of holes provided in the partition therebetween, the water vapor is cooled by virtue of the circulating air in an air cooling chamber, condensing the vapor into water droplets; said droplets being collected in special collection troughs provided for this purpose on the top portion of said partition.

15 Claims, 5 Drawing Figures

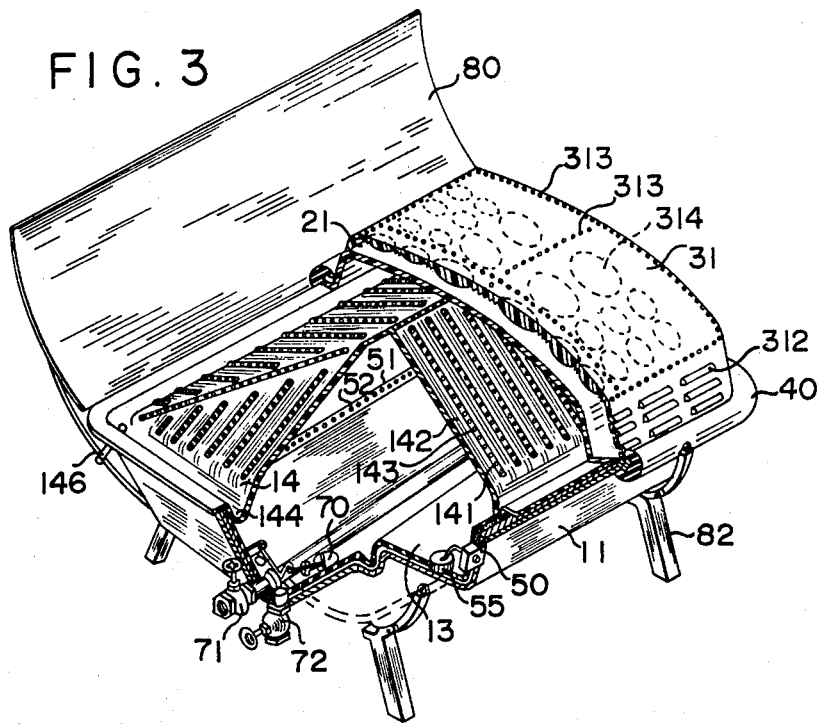
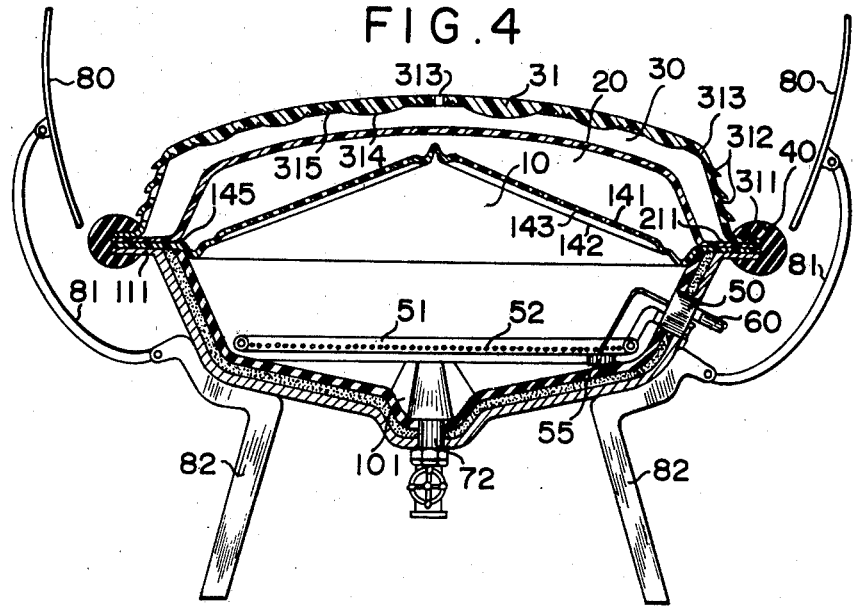

SOLAR POWERED DISTILLING DEVICE

BACKGROUND OF THE INVENTION

Conventional methods of producing distilled water rely on using electricity or fueled fire to heat cold water. The use of combustable materials or electricity to produce distilled water is not economically sound. In addition, the apparatus involved is generally large and the process quite complex, making the price for such apparatus high. For these reasons, generally only hospitals, pharmaceutical and chemical plants are equipped with means to produce distilled water. It has not been possible or economically reasonable for the general public to produce its distilled water in the home.

The purpose of the present invention is to improve the above mentioned defects and to provide an automatic water distiller of simple construction which is safe and convenient and which is not susceptible to malfunctions.

Another purpose of the present invention is to provide an automatic water distilling device which may be installed on the roof of any home, office school, etc. at low cost, or which may be conveniently used on fishing vessels and the like.

DETAILED DESCRIPTION OF THE INVENTION

Further purposes and advantages of the present invention will become obvious as it is now explained with reference to the appended drawings wherein:

FIG. 3 is a perspective view in partial cross section of another embodiment thereof;

FIG. 4 is a cross sectional view of the same embodiment as in FIG. 3;

Figure 1:
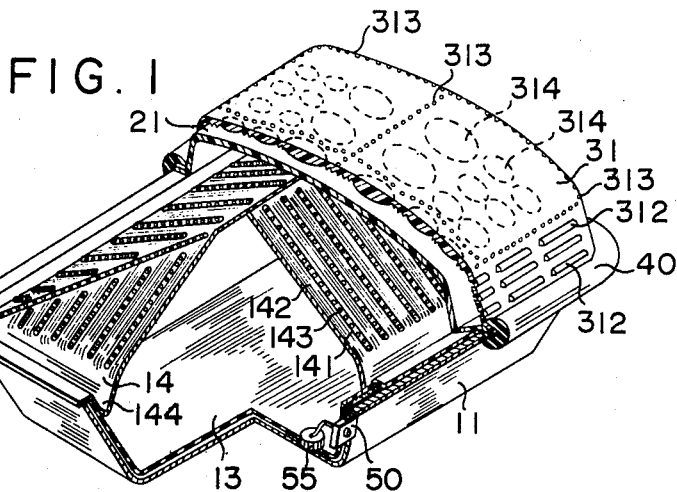
FIG. 1 is a perspective view in partial section of an embodiment of the present invention.
Figure 2:
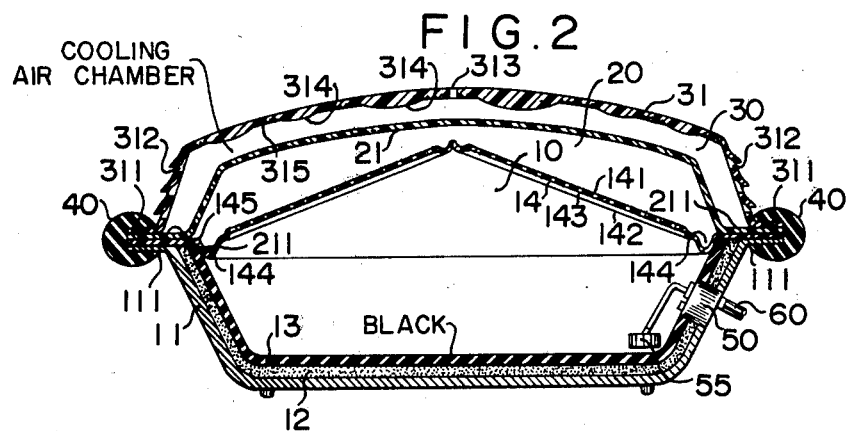
FIG. 2 is a cross sectional view thereof.
Figure 5:
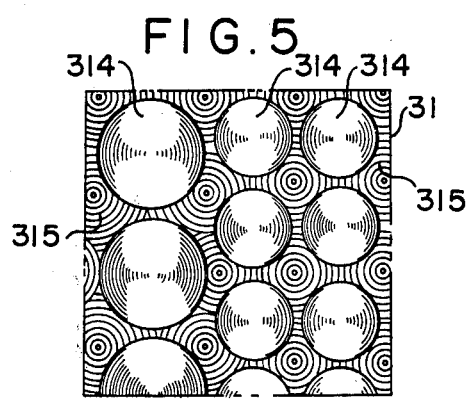
FIG. 5 is a view of the lens cover according to the present embodiments of the present invention.

As shown in FIGS. 1, 2 and 5, the water distilling device according to the present invention is a box-like structure. The bottom portion of said structure consists of a bottom plate 11 having sides inclined outwardly, which is made of metal or any suitable material, an insulating layer 12, and a heat absorbing plate 13, which are layered together to form a vaporizing chamber 10 which also serves as the reservoir. The heat absorbtion plate is a rubber plate or any suitable material and is of a dark coloring, such as black, dark green, etc., for the purpose of absorbing as much heat as possible to heat the water. The insulating layer 12 may be made of polystyrene foam or any suitable insulating material to isolate the inside of the vaporizing chamber 10 from the outside temperature. The upper portion of the vaporizing chamber 10 is covered by a prism shaped corrugated partition 14 which is transparent and slopes downward in all directions. The bottom of all sides of the partition 14 end in a water collecting trough 144. A plurality of holes 143-143 of suitable size & shape are provided through the raised portions 141 of the corrugated partition 14. The bottom of the depressed portions 142 of said partition meet with the water trough 144. The periphery of the corrugated partition 14 is provided with end support sections 145 which are supported on the end support sections 111 of the bottom plate 11; and supported thereon are the end support sections 211 of a transparent condensation plate 21, forming a condensation chamber 20 between the corrugated partition 14 and said condensation plate 21. A transparent lens cover 31 is provided over the condensation plate 21 and is supported thereover by virtue of end support sections 311 which are supported on top of the end support sections 111, 245, and 211. In this way, a cooling air chamber 30 is formed between the condensation plate 21 and the lens cover 31. The end sections are sealed together by means of a rubber or plastic strip 40 which is secured along the periphery of the device.

Each downward sloping wall of the lens cover 31 is provided with a plurality of openings or vents 312-312; the top portion is provided with a plurality of small holes 313-313. The outer surface of the top portion of the lens cover 31 is generally smooth. The inner surface is provided with a plurality of convex lenses 314-314 of various diameters and thicknesses thereon. The spaces between the lenses 314-314 of the lens cover 31 are formed in a plurality of alternately concave and convex annular rings 315-315 to form a ripple like design thereon.

Water enters the vaporization chamber 10 by means of a feed hose 60 and an automatic valve 50. Said automatic valve is provided with a float 55 to open the valve when the water level falls below a specified level and to close the valve when the water level attains a second specified level.

Because the convex lenses 314 are of different sizes and thicknesses, the heat focus points relative thereto will be at different levels in the vaporization chamber 10 to insure greater efficiency. The rings 315 will cast a plurality of heat focus points on the surface of the water and in the air above, thus raising the temperature within the vaporization chamber 10.

When the vaporization chamber 10 is filled with water; the water is heated by virtue of the capacity of the lens cover 31 to cause rays of sunlight to converge at various focus points in, on and above the water. As the water is vaporized, the vapor rises through the partition 14 by means of the holes 143 provided thereon and into the condensation chamber 20. Cool air enters cooling air chamber 30 by means of the plurality of vents 312-312. As cool air passes between condensation plate 21 and lens cover 31, the temperature of condensation plate 21 is maintained at a much lower level than that of the water vapor, so that when the water vapor comes into contact with the condensation plate 21, it will be condensed to water droplets. As the water droplets accumulate and increase in size. They will drop from the condensation plate 21 onto the corrugated partition 14 below and into the depressed portions 142 thereof, wherefrom the accumulated water will flow downwards and into the trough 144. The distilled water will then flow through a hose 146 and into a receptacle not included in the scope of the present invention and not shown in the appended drawings.

FIGS. 3 & 4 show another embodiment of the present invention which is essentially as that described above, but which is adapted to distill sea of salt water so that it may be used on small or large fishing vessels or the like. According to this embodiment, the bottom of the device is angular, sloping down towards the center from both sides. The center or lowest portion thereof is provided with a trough 101, said trough 101 being provided with a float 70 to automatically open an outlet 71 when the quantity of water falls to a specified level. In this way, the remaining water, which will contain a high density of salt, may be drained from the vaporization chamber 10. As the salt may tend to crystallize on the sloping bottom surface, water pipes 51—51 are provided along the bottom periphery of the vaporization chamber 10. These pipes are connected to each other in a suitable fashion and inturn connected to the inlet valve 50, so that when the valve 50 is opened, the water will enter the vaporization chamber 10 from all sides by virtue of holes 52—52, washing any remaining salt crystals down to the trough 101. To remove these salt crystals from the vaporization chamber 10, a larger outlet valve 72 is provided at the bottom of the trough 101.

Either of the two embodiments described above may be provided with reflecting mirrors 80 which may be attached to a base 82 by means of a pivotedly connected mirror brace 81. By virtue of the arched surface of the mirror 80, the maximum effectiveness may be derived from direct and indirect sunlight.

Experiments by the present inventor have shown that a device as described above, 3 feet × 4 feet × 1 feet 4 inches will produce 5 liters of distilled water in a 24 hour period on overcast winter days, and over 30 liters in the same amount of time during sunney summer weather.

The distilled water produced by this method has been tested and found to be as healthful as distilled water produced by conventional means.

What I claim is:

1. A distilling device powered by solar energy comprising:

a tray for defining a vaporization chamber;
   a transparent cover on said tray;
   a transparent condensation plate mounted on said tray;
   a transparent corrugated partition mounted on said tray between said tray and said condensation plate so that a top side of said partition defines a condensation chamber with a bottom side of said condensation plate and a bottom side of said partition defines a vaporization chamber with said tray, said condensation plate being mounted between said partition and said cover so that a top side of said condensation plate defines a cooling air chamber with a bottom side of said cover, said partition having a multiplicity of holes defined therein, that portion of said tray forming said vaporization chamber with said partition having attached thereto a layer of insulating material;
   fluid inlet means on said tray for conducting fluid to be vaporized into said vaporization chamber;
   a plurality of differential focal length solar energy focusing lenses on said cover focusing solar energy through said cooling air and condensation chambers and said partition and said condensation plate onto the fluid located in said vaporization chamber to form vapor which passes through the holes in said partition from said vaporization chamber into said condensation chamber, said leases having a plurality of different focal lengths to focus solar energy at different levels in said vaporization chamber, thereby focusing solar energy into, on and above water in said vaporization chamber;
   air inlet means on said cover for conducting cooling air into said cooling air chamber to contact said condensation plate one side for maintaining said plate at a temperature below the condensation temperature of the fluid in said vaporization chamber so that vapor formed in said vaporization chamber is condensed into condensate upon contact with said plate other side;
   a condensate collecting means connected to said tray for collecting the condensate formed on said condensation plate; and
   outlet means connected to said condensate collecting means for withdrawing the collected condensate from said condensate collecting means.

2. The device of claim 1 wherein the holes are located in peaks in said corrugated partition.

3. The device of claim 2 wherein valleys in said corrugated partition are fluidly connected to said condensate collecting means.

4. The device of claim 1 wherein said air inlet means includes vents defined in said cover.

5. The device of claim 1 wherein said fluid inlet means includes a float valve.

6. The device of claim 1 wherein said lenses are located inside said cooling air chamber.

7. The device of claim 1 wherein said lenses are convex.

8. The device of claim 1 wherein said partition is angular with a peak portion defined centrally thereof.

9. The device of claim 1 wherein said tray is a box-like structure.

10. The device defined in claim 1, further including at least one reflecting mirror connected to said housing to increase the amount and intensity of heat from the sun to the plurality of lenses.

11. The device of claim 1 further including a plurality of focusing rings located on said cover for focusing solar energy into said vaporization chamber at various locations on the surface of the fluid located in said vaporization chamber.

12. The device of claim 11 wherein said rings are located in the spaces between said lenses.

13. The device of claim 11 wherein said rings are alternately concave and convex.

14. The device of claim 1 further including cleansing means positioned in said tray to be located in said vaporization chamber for circulating drainage fluid therethrough to cleanse said vaporization chamber.

15. The device defined in claim 14 wherein said cleansing means is located near the center of the bottom portion of said vaporization chamber and includes a trough and suitable valves to effect draining of water and removal of salt crystals therefrom.

* * * * *